Aug. 6, 1935.  H. KARRE  2,010,492

LOCKING DEVICE FOR CUPBOARDS AND THE LIKE

Filed June 11, 1934

Inventor:
Hugo Karre
By E. F. Wenderoth
Atty

Patented Aug. 6, 1935

2,010,492

UNITED STATES PATENT OFFICE 2,010,492

LOCKING DEVICE FOR CUPBOARDS AND THE LIKE

Hugo Karre, Eskilstuna, Sweden

Application June 11, 1934, Serial No. 730,118 In Sweden June 19, 1933

2 Claims. (Cl. 292—126)

My present invention refers to an improved construction of locking devices for cupboard doors and the like, and more specifically to a locking device of the type in which a base plate has pivotally mounted thereon a spring-actuated handle and a spring-actuated hook member which latter may be tilted by means of the handle but is permitted to be tilted also independently of said handle.

According to the invention the handle and the hook member are pivotally mounted on the same shaft which is substantially parallel with the base plate and supported by a pair of spaced flaps extending from the front side of the base plate at opposite sides of an aperture therein for penetration by the hook member, the handle member being bow-bent and the bearing end thereof forming a cap or the like open to the aperture and enclosing the spring means and the bearing end of the hook member.

By these means the locking device gets a neat appearance and all of its constructional parts not directly adapted to be manually acted upon take a hidden position.

The invention is illustrated in the accompanying drawing in which:—

Figure 1:
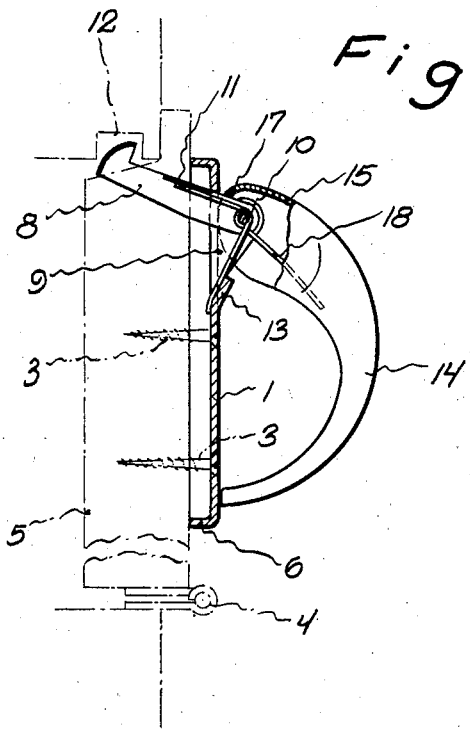
Fig. 1 shows a preferable embodiment of the new cupboard lock seen in elevation and partly in section.
Figure 2:
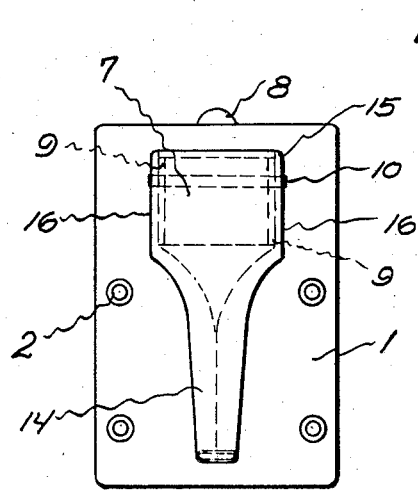
Fig. 2 is a front view of the same.

In the drawing, 1 represents a base plate member of one suitable shape or another, such plate being provided with bores 2 for accommodation of screws 3, or the like, by means of which the locking device is to be mounted on a cupboard door 5 hinged at 4. If desired, the edges of the plate 1 may be provided with inwardly directed flanges, as shown at 6, in order to give the same a somewhat raised position, and thereby the locking device will also get a neater appearance.

Adjacent to its one end the plate 1 is provided with an aperture 7, and the tiltable hook member 8 extends inwardly through this aperture. At the cutting of the aperture 7 in the plate 1, two metal flaps 9 are left to remain at opposite sides thereof, and these flaps are bent out so as to extend at substantially right angles on the front side of the plate. Said outbent flaps form bearings for a pin 10 mounted parallel with the plate 1 and forming a pivotal centre for the hook member 8. The said hook member is freely tiltable on the pin 10 and actuated upon by a spring 11 tending to maintain the same in the position shown in Fig. 1, in which it extends into an aperture, or depression in a plate or the like fixedly mounted in the cupboard.

The spring 11 may suitably consist of a coil spring wound around the pin 10 and provided with straight end portions adapted to be seated against the hook 8 and the inner inclining edge 13 of the aperture 7, respectively.

A handle 14 is provided for the actuation of the hook 8 at the opening of the door. In the embodiment shown the handle has a bow-bent shape and the end of the same is normally in contact with the base plate 1, but naturally this shape is not essential to the function and may be varied according to will. It is essential, however, that the handle at the end of the same adjacent to the pivot pin is given the shape of a cap or casing 15 entirely covering (straddling) the bearing means 9 and the end of the hook 8 extending through the aperture 7, and hiding the latter. Hereby the construction as a whole will get a neat and attractive appearance. The handle may be made for instance from pressed sheet metal so as to form a semicircular and hollow body the cross sectional area of which is successively increasing from the free end of the said body towards the cap-shaped end straddling the bearings, the said cap being inwardly open towards the aperture 7.

The cap 15 is provided with a pair of parallel sides 16 positioned outside of the corresponding bearing flaps 9 and provided with bores for the pin 10. By riveting the ends of the pin, or by other suitable means, it is prevented from axial displacement. The cap 15 is also provided with a bent end 17 forming an abutment in contact with the hook 8 and serving to transmit the tilting movement of the handle to the hook when opening the lock.

The handle is also acted upon by a coil spring 18 surrounding the pin 10 and constructed substantially similarly as the spring 11, the ends of the spring 18 being seated against the inclined edge portion 13 of the aperture 7 and the inner side of the handle 14, respectively. Hence, both of the springs 11 and 18 will take a completely hidden position.

The end of the spring 11 seated against the hook member 8 is preferably countersunk therein, and for such purpose the hook may be made of pressed sheet metal and given a substantially U-shaped cross section adjacent to the pivot pin.

When the cupboard door is shut, the handle 14 by means of the spring 18 is kept in the position shown in Fig. 1, so that the free end of the handle is in contact with the base plate. Simultaneously the hook member 8 is kept in engagement with the depression 12 by means of the spring 11. When the handle is tilted in a counter-clockwise direction as viewed in Fig. 1, the said movement by means of the bent edge 17 is transmitted to the hook 8 so that the latter is brought out of engagement with the depression 12 under counter-action of the spring 11, and thereafter the cupboard door may be opened.

When the handle is released, it will return to the position shown in Fig. 1 due to the action of the spring 18.

When shutting the door the hook 8 will automatically snap into the depression 12 but since it is not directly connected with the handle and can freely tilt in relation to the same, the handle will not be acted upon or tilted.

Instead of using two separate springs 11 and 18, as shown in the drawing, it is possible to use one single spring comprising two sections. Also in other ways the construction may be varied without departing from the invention.

As the whole mechanism is enclosed within the hollow body serving as a handle and positioned at the front side of the base plate, no portion of the device must be countersunk in the face of the door which may be provided with an aperture to be penetrated by the hook member only, and therefore the mounting of the device is considerably facilitated.

What I claim and desire to secure by Letters Patent is:—

1. In a locking device of the character described, a base plate member, a pair of spaced bearing flaps extending from the front side of the base plate at opposite sides of an aperture provided therein, a pivot pin mounted in the bearing flaps and extending between them substantially parallel with the base plate, a bow-bent handle member made from sheet metal and pressed into a cap-shaped end portion the opening of which faces the base plate, such handle member at its cap-shaped end being pivotally mounted on said pivot pin and adapted at its opposite end to form an abutment for limitation of its turning movement in the locking direction, a hook-shaped locking member pivotally mounted on the pivot pin independently of the handle member and within the cap-shaped end of the same, said locking hook extending through the aperture in the base plate and being adapted to be straddled and hidden by the said cap-shaped end of the handle member, spring means mounted around the pivot pin within the cap-shaped handle end and adapted to act on the handle member and the locking hook for causing them automatically to take a locking position, and an abutment on the cap-shaped end of the handle member adapted to co-act with the locking hook for turning of the same into an open position.

2. In a locking device according to claim 1, the additional feature that the cap-shaped end of the handle member is adapted to straddle and substantially to hide also the bearing flaps on the base plate.

HUGO KARRE.